Nov. 12, 1940.   J. F. REMINGTON   2,221,436
SKIVING MACHINE
Filed Sept. 2, 1939   2 Sheets-Sheet 2
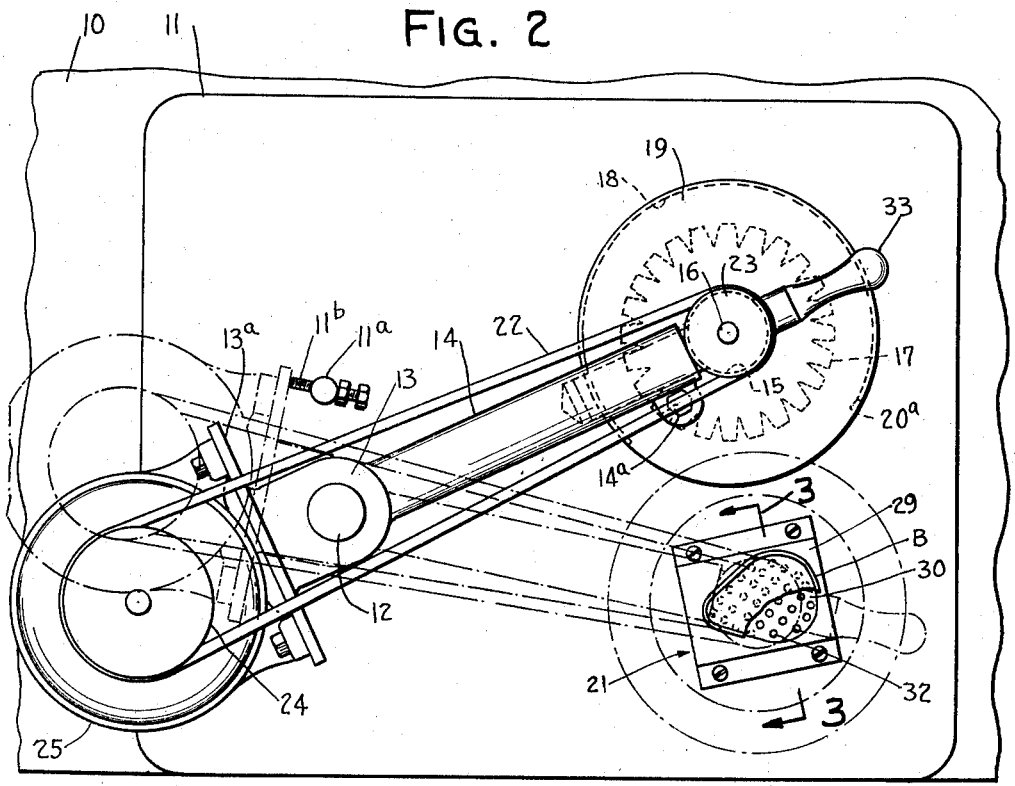
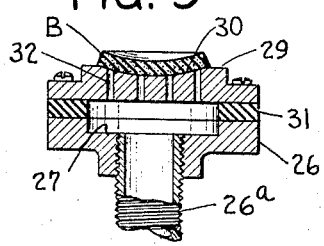
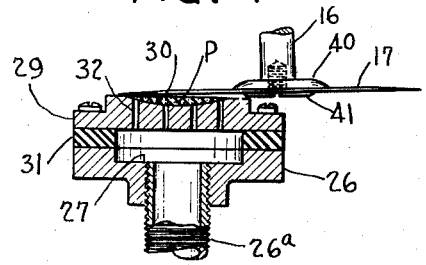
INVENTOR
JOSEPH F. REMINGTON
BY
ATTORNEY Patented Nov. 12, 1940

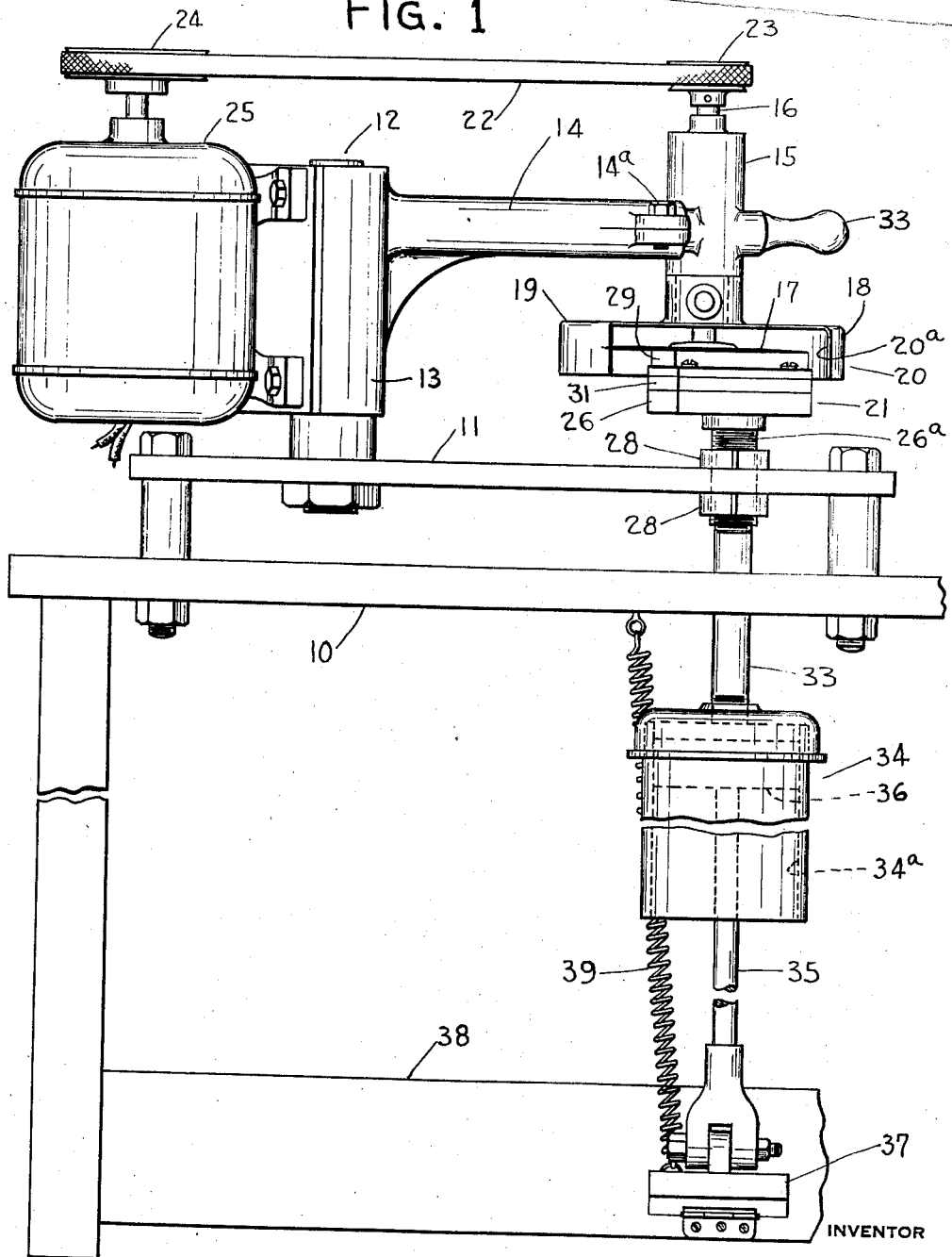

2,221,436

UNITED STATES PATENT OFFICE 2,221,436

SKIVING MACHINE

Joseph F. Remington, Akron, Ohio

Application September 2, 1939, Serial No. 293,233

1 Claim. (Cl. 12—63)

This invention relates to skiving machines, and in particular relates to apparatus for making skived pieces, such as footwear inserts, from sponge rubber, rubber, leather or like material.

An object of the invention is to provide a simple, efficient machine for making skived pieces for footwear inserts, or the like from sponge rubber, or similar materials, at a minimum cost of production.

Another object of the invention is to provide in a skiving machine improved means for effectively retaining the material to be skived for the skiving operation.

Another object of the invention is to provide a skiving machine of the character described in which the blanks, from which the skived pieces are made, may be fed into the machine and the finished pieces removed therefrom in substantially rapid succession.

These and other objects of the invention will be manifest from the following brief description and the accompanying drawings.

Of the accompanying drawings:

Figure 1 is a front view, partly broken away, of the apparatus embodying the invention.

Figure 2 is a plan view thereof.

Figure 3 is a cross-section, taken substantially on line 3—3 of Figure 2, illustrating the manner in which the blanks are held in the matrix.

Figure 4 is a view, similar to Figure 3, illustrating the skiving operation.

Figure 5 is an edge view of a footwear insert produced by the apparatus.

Referring to the drawings, mounted on a table 10 may be a base plate 11 having secured thereto an upwardly extending shaft 12, and suitably journalled on the latter may be a tool support 13 having integral therewith a horizontally extending arm 14. Suitably secured for longitudinal adjustment on the free end of arm 14, may be a bearing 15 for a vertically extending shaft 16, on the lower end of which is fixed a skiving tool 17, preferably a disc knife of known type, adapted to cut substantially in a horizontal plane. A pin 11$^a$ fixed in plate 11 may have an adjustable screw 11$^b$ therein for engaging flange 13$^a$ on support 13, to limit forward swinging movement of said support, as shown in chain-dotted lines in Figure 2.

For guarding the machine operator against accidental injury by knife 17, a casing 18, comprising a circular top plate 19 having an annular flange 20 extending downwardly therefrom, may be secured to the bottom of bearing 15. The front side of flange 20 has an opening 20$^a$ therein, preferably just large enough for receiving the upper portion of a work-holding device, indicated generally at 21, when knife 17 is swung in an arc about shaft 12, said device being located forwardly of knife 17 in the normal inoperative position of the latter.

For driving the shaft 16 to rotate knife 17, a V-belt 22 may connect between a pulley 23, fixed on the upper end of shaft 16, and a similar pulley 24 of an electric motor 25 suitably mounted on the pivoted support 13.

The holding device 21 may comprise a block 26 having a nipple 26$^a$ threaded therein to communicate with a recess 27 in the top face of said block. This nipple extends downwardly through an opening in plate 11, and is vertically adjustably secured to plate 11 by means of nuts 28, 28, threaded on the nipple, for engagement with opposite sides of the plate. Removably secured against the top face of block 26 may be a matrix or die 29 having a cavity 30 on the upper face thereof of substantially the shape and depth of the article or skived piece to be formed therein, as will subsequently be described. By means of the nuts 28, the height of holding device 21 may be vertically adjusted so that the top face of matrix 29 is substantially in the same plane with bottom face of the disc knife 17, with clearance as desired. Between the matrix 29 and block 26 may be a suitable gasket 31 of rubber, sponge rubber, or the like. Matrix 29 is provided with a plurality of openings 32, 32 to communicate the cavity 30 with the suction chamber provided by recess 27 in block 26.

Interiorly threaded in the lower end of nipple 26$^a$ may be a pipe 33 which connects the chamber 27 with the interior of a suction pump 34 adjacent the top thereof. The lower end of a piston rod 35 of a piston 36, reciprocally received in a cylinder 34$^a$ in pump 34, may be pivotally connected to a suitable foot treadle 37 pivoted on a cross-bar 38 at the rear of table 10. A tension spring 39, connected between treadle 37 and the top board of table 10, normally causes piston 36 to be yieldably urged upwardly in cylinder 34$^a$. The arrangement is such that an operator, by applying foot-pressure on top of treadle 37, against the yielding action of spring 39, applies suction to the cavity 30 of matrix 29.

In order to eliminate tendency of disc type knives to break the suction holding blanks B in matrix cavity 30 when the blank is being skived, knife 19 should be relatively thin. This makes it impractical, in securing the knife to shaft 16, to countersink the lower face of the knife for receiving a flat-headed screw. In the present construction the knife 17 may be secured against a shoulder 40 on shaft 16 by means of a relatively thin-headed screw 41 threaded into the end of the shaft. The bearing 15 is then adjusted angularly in supporting arm 14, by means of adjusting screw 14ª, to set the knife at an angle to the horizontal just sufficient that the head of screw 41 will barely clear the top face of matrix 29 as the knife is swung past it. This may be accomplished so that the knife will be so substantially in a horizontal plane as not to apply an upward pull on blank B to break the suction effect holding it in matrix 29, and so that the skived surface of the piece P will be substantially flat while it is still held in cavity 30 by suction.

In the operation of the apparatus motor 25 is driven continuously to rotate shaft 16 carrying disc knife 17. An operator, stationed in front of the machine, first places a blank B of desired thickness and shape over the cavity 30 of matrix 29, the blanks preferably being precut from suitable material such as sponge rubber, rubber, leather or the like, and placed in stacks within convenient reach of the operator. Simultaneously with placement of a blank on the matrix 29, the operator yieldingly presses the treadle 37, to draw the blank B into cavity 30 by suction (see Figure 3), while with his free hand upon handle 33 he swings support 13, and the parts carried thereby, from the full line to the chain-dotted positions thereof shown in Figure 2. This movement of rotating knife 17 cuts or skives that portion of blank B which projects above the top face of matrix 29 from the portion drawn into cavity 30 by suction, thereby leaving skived piece P in the cavity as bracket 13 is swung back to the full-line position thereof (Figure 2). As the knife 17 is moved away from the matrix 29, the operator releases his foot from treadle 37 to release the suction effect from the skived piece P. The inherent tendency of the piece to resume its normal shape causes it to become convex on top and flat on the bottom, as shown in Figure 5, which facilitates removal of the piece from matrix 29 to replace it with another blank B.

Thus it readily is seen that an operator, operating the suction means with his foot while using one hand to swing the knife to-and-fro past the face of the top matrix 29, may replace the finished skived pieces with blanks in substantially rapid succession. The flanges 20 of knife 17 and guard 18 substantially eliminate danger of the operator's hands being accidentally cut by the knife 17 as it is swung toward the matrix 29.

Modifications of the invention may be resorted to without departing from the spirit thereof or the scope of the appended claim.

What is claimed is:

A machine of the character described comprising a fixed matrix, means for applying suction to said fixed matrix to hold a blank therein, a member shiftably mounted in association with said matrix, a disc cutter rotatably mounted on said member, and means on said member for rotating said cutter, said member being shiftable on its mounting to move said disc cutter toward and from said matrix substantially in a plane with the top face of the matrix for skiving the blank held in the matrix.

JOSEPH F. REMINGTON.